July 15, 1958

G. R. STIBITZ 2,842,977

ELLIPTICAL GEAR

Original Filed Oct. 20, 1951

INVENTOR.
George R. Stibitz
BY

ATTORNEYS

July 15, 1958 G. R. STIBITZ 2,842,977
ELLIPTICAL GEAR
Original Filed Oct. 20, 1951 5 Sheets-Sheet 2

INVENTOR.
George R. Stibitz
BY
Carlson, Pitzner, Hubbard & Wolfe
ATTORNEYS

July 15, 1958
G. R. STIBITZ
2,842,977
ELLIPTICAL GEAR
Original Filed Oct. 20, 1951
5 Sheets-Sheet 3
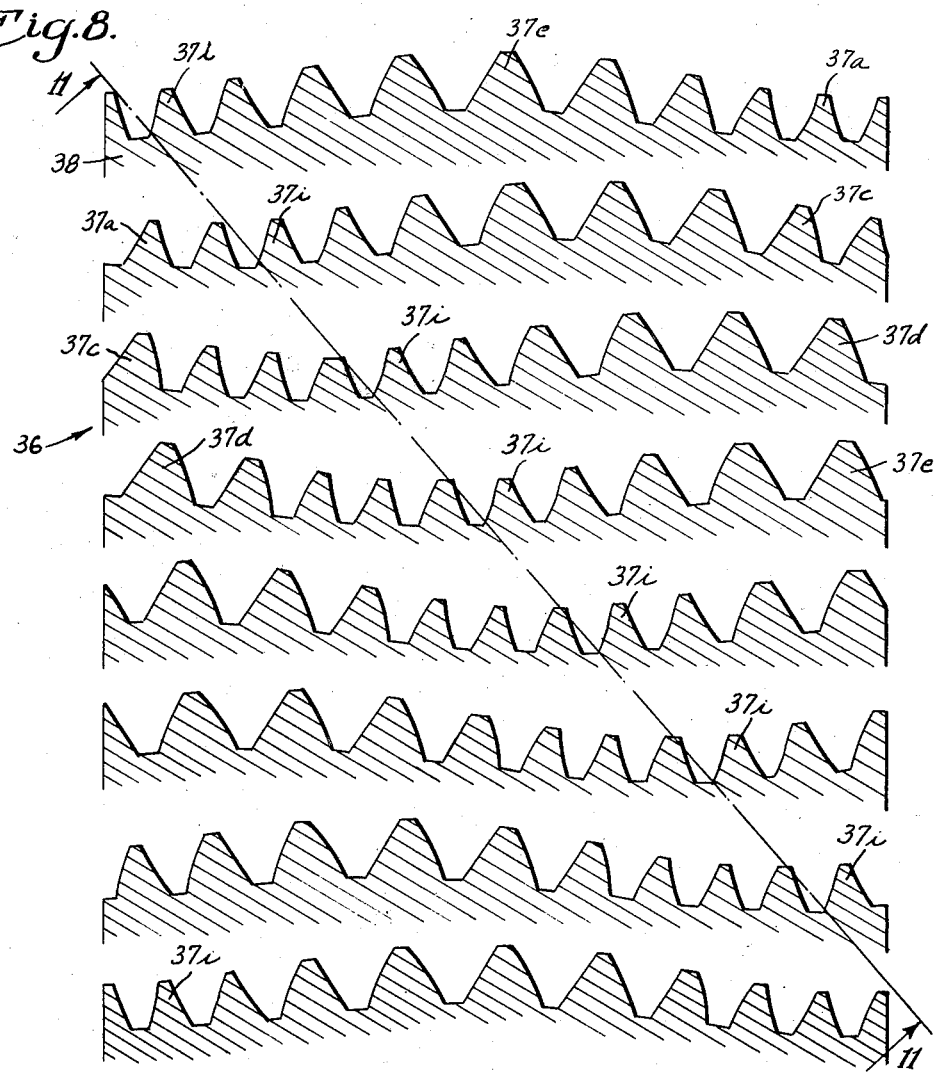
INVENTOR.
George R. Stibitz
BY
Carlson, Pitzner, Hubbard & Wolfe
ATTORNEYS July 15, 1958     G. R. STIBITZ     2,842,977
ELLIPTICAL GEAR Original Filed Oct. 20, 1951     5 Sheets-Sheet 4

INVENTOR.
George R. Stibitz
BY
Carlson, Pitzner, Hubbard & Wolfe
ATTORNEYS

July 15, 1958    G. R. STIBITZ    2,842,977
ELLIPTICAL GEAR

Original Filed Oct. 20, 1951    5 Sheets-Sheet 5

INVENTOR.
George R. Stibitz
BY
ATTORNEYS

United States Patent Office 2,842,977
Patented July 15, 1958

2,842,977

ELLIPTICAL GEAR

George R. Stibitz, Burlington, Vt., assignor to Barber-Colman Company, Rockford, Ill., a corporation of Illinois Original application October 20, 1951, Serial No. 252,374. Divided and this application March 19, 1954, Serial No. 417,293

4 Claims. (Cl. 74—437)

This invention relates to a spur toothed elliptical gear adapted for rotation about an axis coincident with a focus of an ellipse intersecting the pitch lines of the gear teeth.

One object of the invention is to provide an elliptical gear having teeth of novel form and adapted to be cut on an ordinary gear hobbing machine.

A more detailed object is to form the side faces of the different teeth and the faces on opposite sides of each tooth with a different contour but in such a manner that each face is a true elliptical involute.

Other objects and advantages of the invention will become apparent from the following detailed description taken in connection with the accompanying drawings, in which—

Fig. 8 shows the relation of the rows of hob teeth at spaced intervals around the full circumference of the hob.

Fig. 9 is a plan view of the gear in a fixture for locating the mounting hole.

Figure 2:
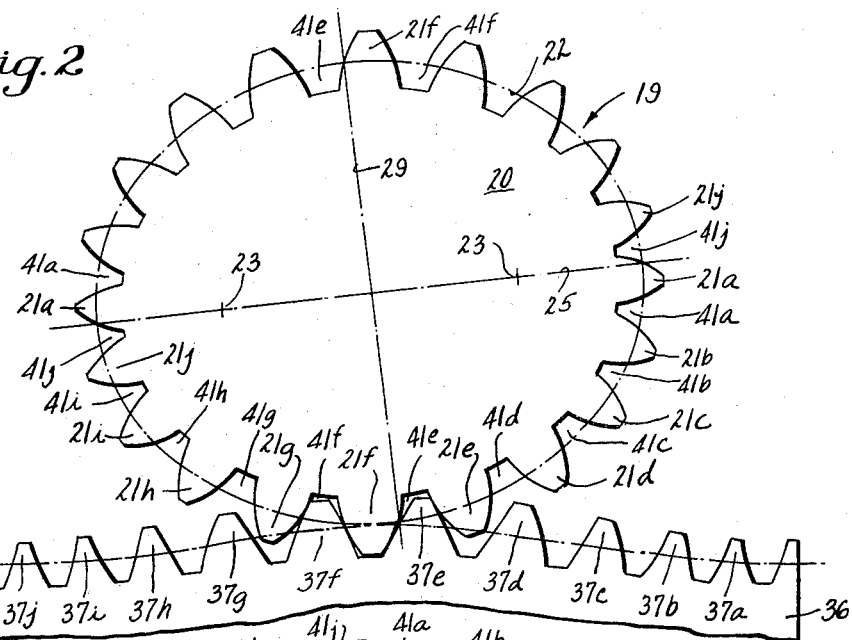
Fig. 2 is a plan view of the gear together with one row of hob teeth at the completion of the hobbing machine.
Figure 1:
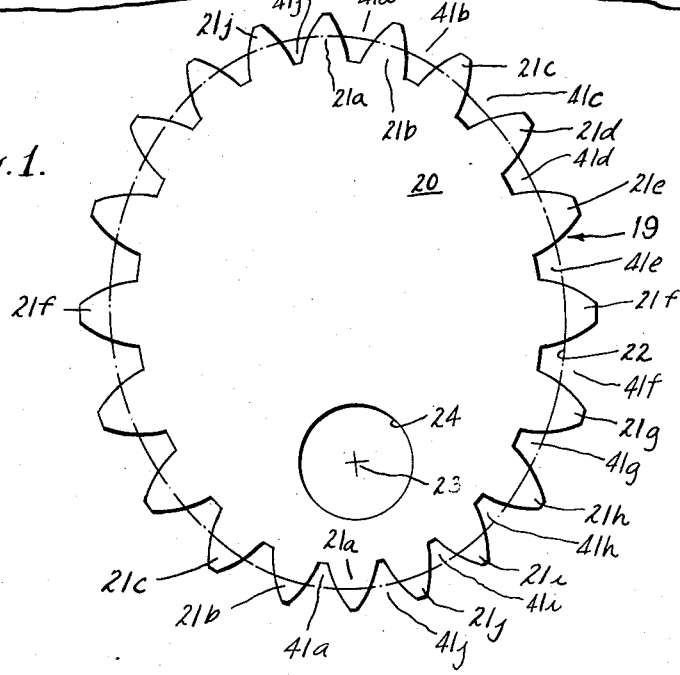
Figure 1 is a plan view of the improved gear.

As shown in the drawings for purposes of illustration, the invention is embodied in an elliptical gear, indicated generally at 19, which comprises a solid body 20 with spur teeth 21, twenty in the present instance, projecting from the periphery thereof and having pitch lines which lie on an ellipse 22 whose foci are at 23. A hole 24 adapted to receive a shaft for supporting the gear is cut in the body concentric with one focus of the ellipse. Herein, each tooth on one side of the major axis 25 of the pitch ellipse is a duplicate of the diametrically opposite tooth on the other side of the axis.

In accordance with the present invention, each tooth 21 is a true involute of a base ellipse 26 which is confocal with the pitch ellipse 22 and preferably is smaller than the latter so as to be within the roots of the gear teeth. With this arrangement, the side faces of the different teeth and the faces on opposite sides of each tooth differ from each other but, since each face of one elliptical gear always engages the same face of the mating elliptical gear, the two gears mesh properly.

Figures 12, 13:
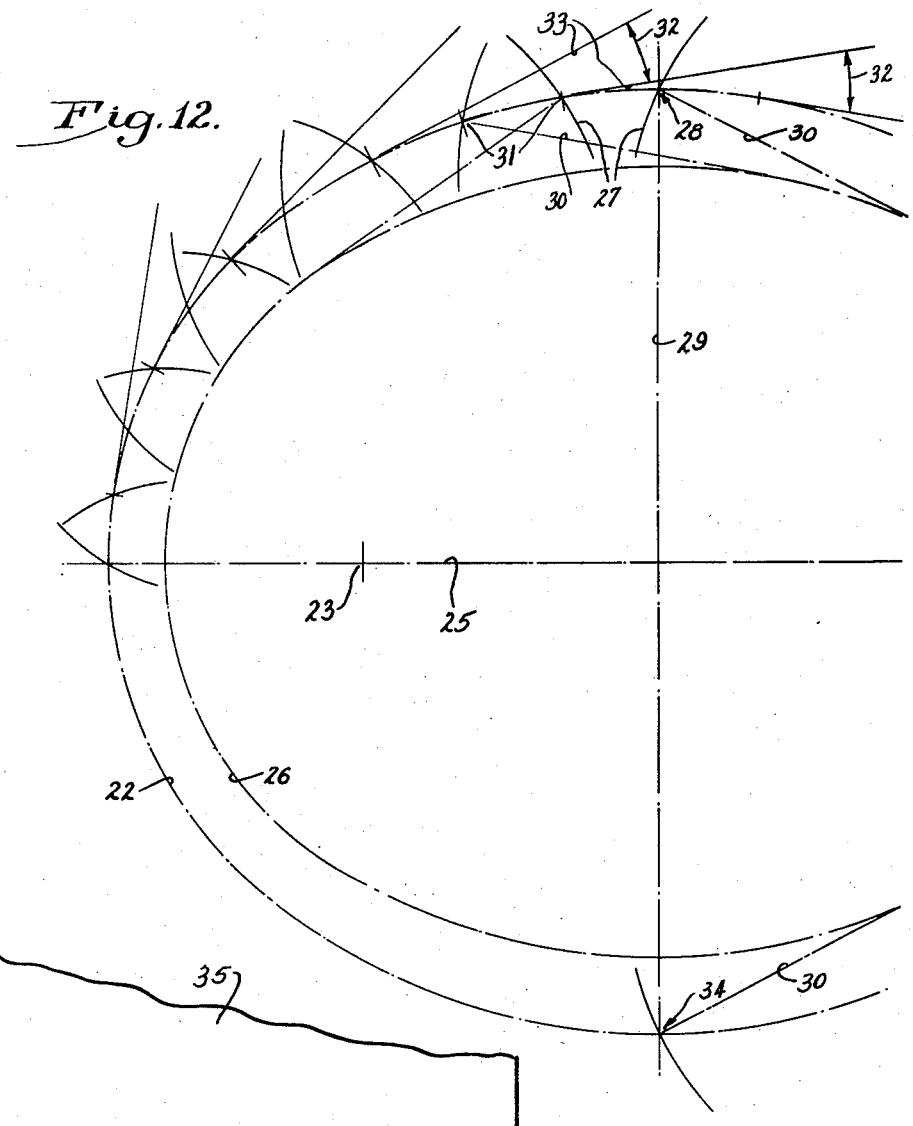
Fig. 12 is a fragmentary view illustrating the manner of laying out the gear tooth forms.
Fig. 13 is a plan view of a form tool used in cutting the hob teeth.

To ascertain the different tooth forms from the base ellipse 26 and the concentric pitch ellipse 22, successive involute curves 27 are laid out across the pitch ellipse starting for example with the pitch point 28 (see Fig. 12) at the intersection of the minor axis 29 and the pitch ellipse. The involute is the path described by a point on an inextensible cord 30 as the latter is unwound from the periphery of the base ellipse 26.

One way of locating the pitch points 31 of the adjacent gear teeth is to equalize the angles 32 between the adjacent tangents 33 to the pitch ellipse through the pitch points of the adjacent gear teeth, each angle being equal to one revolution divided by the number of teeth in the gear to be produced. After the involutes for one side of the various teeth have been laid out, the process is repeated to determine the form of the opposite tooth faces starting at the point 34 of intersection of the pitch ellipse and the opposite end of the minor axis 29.

As a result of holding the tangent angles 32 constant, the gear teeth $21^f$ at opposite ends of the minor axis will be widest and the pitch width will decrease progressively toward the major axis, the teeth $21^a$ being narrowest. This is advantageous in that the number of teeth of two meshing gears that are in contact with each other is the same for all positions of the gears. This will be apparent from the application of simple geometric principles from which it will be seen that the angle between two adjacent teeth is equal to the angle between the tangents of these teeth. In other words, the angle between the leading face of one tooth and the leading face of the next tooth is equal to the angle 32. Since the angles between successive tangents, that is, the angles 32, are equal around the entire gear, the teeth are equally spaced around the gear.

Figure 11:
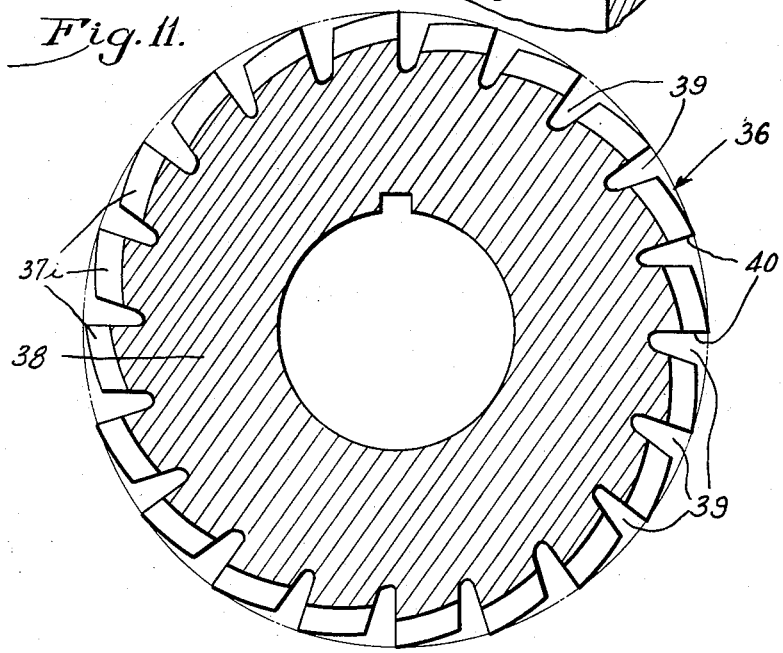
Fig. 11 is a cross-sectional view of the hob taken along the line 11—11 of Fig. 8.

In order that the gear may be cut on an ordinary hobbing machine, the tooth form of the gear is used in a manner well known in the art to lay out a basic rack (not shown) and thus determine the shape of a form tool 35 (Fig. 13) used in cutting the teeth of a hob 36. The teeth $35^a$ of the tool 35, which correspond in contour to the respective teeth on one side of the gear to be hobbed, are offset from each other different distances longitudinally of the tool body. The amounts of the offset vary progressively across the tool and correspond to the variation in radial spacing of the gear teeth 21 between the major and minor axes. Cutting of the hob teeth is performed in the usual way in a back off lathe on a hob body 38 previously formed with longitudinally extending gashes 39 paralleling the rotational axis. In the turning operation, the form tool 35 is fed across the periphery of the hob body at a rate synchronized with the speed of the body thus imparting a predetermined lead as shown in Fig. 8 to the threads or rows of teeth 37. The teeth of each helical row on the hob project equal distances from the hob axis as shown in Fig. 11, and their cutting faces 40 shown in Fig. 8 are similar in shape and correspond to the contour of the gear tooth spaces 41 which are generated by the teeth of the row.

As illustrated in Fig. 8, the hob teeth of different helical rows are differently spaced radially relative to the hob axis owing to the different radial positions of the different gear teeth 21 from the center of the pitch ellipse 22. Thus the teeth $37^e$ for milling the gear tooth spaces $41^e$ along the shorter axis 29 of the ellipse project farthest from the hob axis while the teeth $37^a$ for generating the spaces $41^a$ on the major axis 25 are spaced correspondingly shorter distances from the hob axis.

The number of different rows of teeth 37 on the hob is correlated with the number of teeth 21 on the gear to be generated so that the teeth of each row will cut two of the gear tooth spaces 41, that is, the corresponding or diametrically opposite spaces of the gear. For generating the twenty booth gear shown, there are ten different tooth rows $37^a$ to $37^j$ on the hob each adapted to mill out the metal and form two diametrically opposite spaces 41 of the gear when, in a standard hobbing operation, the gear blank is rotated one revolution for each two revolutions of the hob. As a result of this correlation, the hob for cutting a given gear may be made of minimum size.

Figure 10:
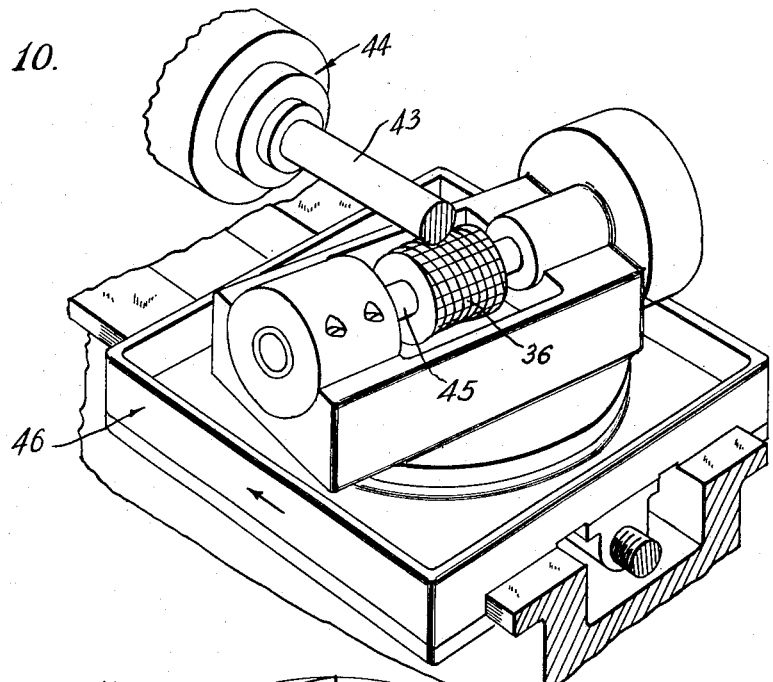
Fig. 10 is a schematic view of parts of a hobbing machine in which the improved hob may be used to cut the elliptical gear.

In using the hob 36 to cut the gear 19, a solid blank 43 (Figs. 3 and 10), which is larger than the major dimension of the gear 19 and may be of any cross-sectional shape, is mounted fast on the work spindle 44 of the hobbing machine which, after selection of the proper drive gearing, is arranged to rotate at a speed equal to one half the speed of the spindle 45 carrying the hob and set at the proper angle relative to the work spindle. The hob spindle is carried by a slide 46 adapted to be fed in the direction of the arrow (Fig. 10) to move the hob into engagement with and across the periphery of the blank at the proper rate.

Figure 3:
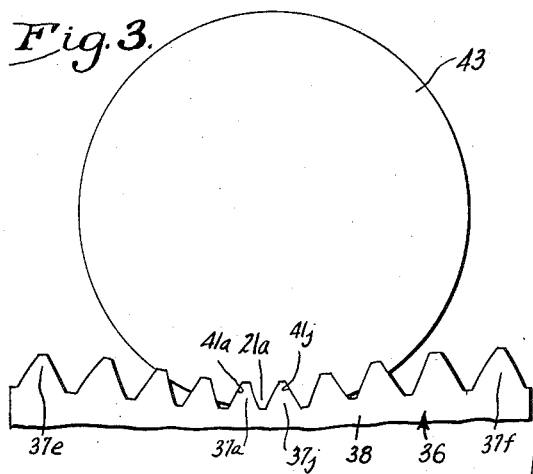
Figs. 3 to 7 are similar views at different points in the initial part of the hobbing cycle.
Figure 4:
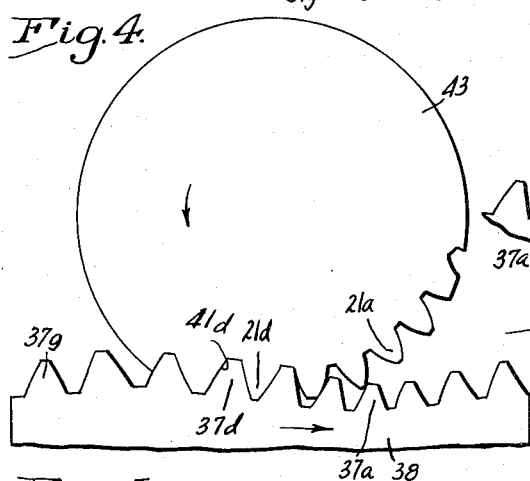
Figure 5:
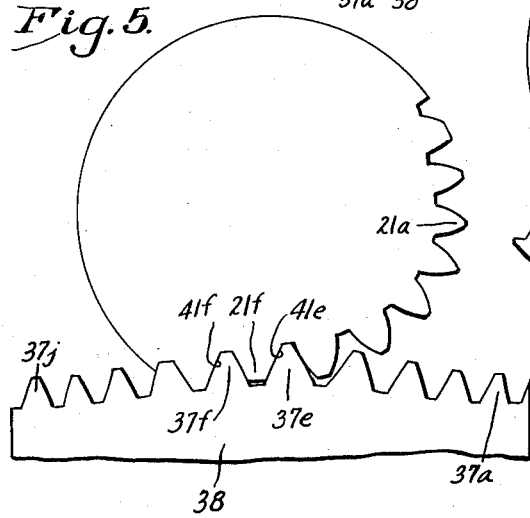
Figure 6:
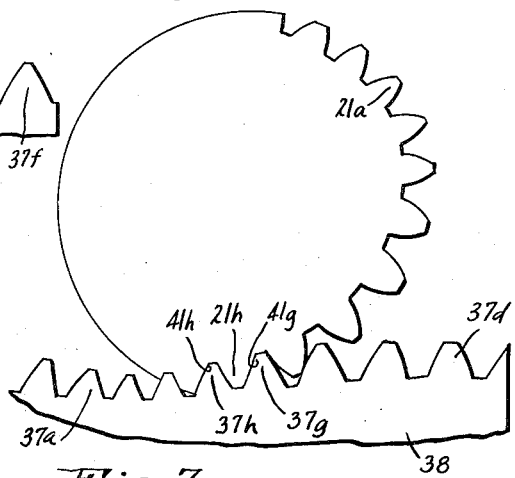
Figure 7:
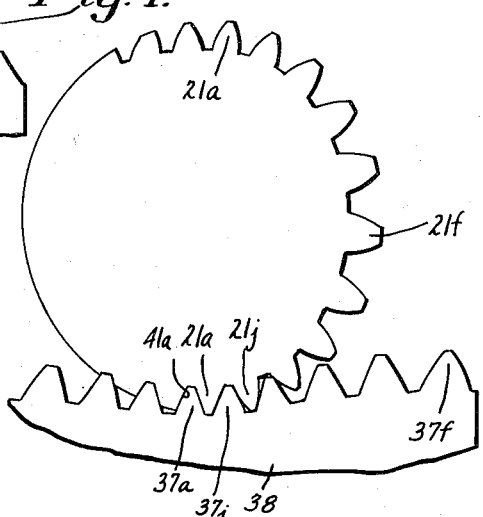

As the rotating hob advances into engagement with the blank, the hob teeth of the different rows cut into the blank at angularly spaced points as illustrated in Fig. 3, the starting point being immaterial. Owing to the lead of the hob tooth rows, the position of the hob teeth, for example 37ª, cutting the gear tooth space 41ª, progresses along the hob axis as indicated by the arrow (Fig. 4) and at the same time the hob teeth of successive adjacent rows become active as shown in Figs. 4 to 7. By the time that the gear blank has turned through a half revolution, the part of the blank corresponding to the position of the other space 41ª will, as shown in Fig. 7, be positioned for engagement by the same teeth 37ª which initiated the cutting of the first space 41ª. The result is that in successive revolutions of the hob, the teeth in one helical row operate on the gear tooth spaces 41 on diametrically opposite sides of the gear blank, and the teeth of the respective rows generate the side walls of the corresponding spaces and cut the latter to the proper depth to form the gear. The latter will be completed when the hob has been fed fully across and out of engagement with the gear.

Since, as described above, variation in the radial positions of the successive gear teeth 21 is achieved by varying the radial positioning of the hob teeth 37 of different rows, the entire hobbing operation is achieved during rotation of the blank about the axis of the pitch ellipse 22 and without changing the spacing of the hob and gear blank axes. The cutting action may be initiated at any point in the revolution of the blank and the latter need not be of elliptical cross section or otherwise correlated with the shape of the final gear. Round bar stock as shown in Fig. 3 may thus be used to advantage.

After cutting of the gear teeth, the mounting hole 24 is formed with its axis coincident with one of the foci 23 of the pitch ellipse 22. This may be accomplished by placing the gear in a suitable fixture having upstanding pins 48 adapted to mesh closely with gear tooth spaces 41 on diametrically opposite sides of the gear as shown in Fig. 9. The center of the hole 24 may be located through the use of a plate 49 (Fig. 9) having holes 50 for receiving the pins 48 and a hole 51 centered at one focus of the pitch ellipse 22 and operable to guide a tool for forming the mounting hole 24.

This application is a division of my copending application Serial No. 252,374, filed October 20, 1951.

I claim as my invention:

1. An elliptical spur gear comprising a body and circumferentially spaced teeth projecting outwardly therefrom and having pitch lines lying on an ellipse, the angles between the tangents of adjacent teeth at said pitch ellipse being equal around the entire gear, the pitch width of the successive teeth changing progressively from one end of the major axis of said ellipse to the next adjacent end of the minor axis thereof, and the side of each of said teeth being the involute of a base ellipse of different size than said pitch ellipse.

2. An elliptical spur gear comprising a body and circumferentially spaced teeth projecting outwardly therefrom and having pitch lines lying on an ellipse, the angles between the tangents of adjacent teeth at said pitch ellipse being equal around the entire gear, the pitch width of the successive teeth changing progressively from one end of the major axis of said ellipse to the next adjacent end of the minor axis thereof.

3. An elliptical spur gear comprising a body and circumferentially spaced teeth projecting outwardly therefrom and having pitch lines lying on an ellipse, the angles between the tangents of adjacent teeth at said pitch ellipse being equal around the entire gear, the pitch width of the successive teeth changing progressively from a minimum at each end of the major axis of said ellipse to a maximum at the next adjacent end of the minor axis thereof.

4. An elliptical spur gear comprising a body and circumferentially spaced teeth projecting outwardly therefrom and having pitch lines lying on an ellipse, the side of each of said teeth being the involute of a base ellipse of different size than said pitch ellipse, the angles between the tangents of adjacent teeth at said pitch ellipse being equal around the entire gear.

References Cited in the file of this patent

UNITED STATES PATENTS 2,585,971    Sloane _____ Feb. 19, 1952

OTHER REFERENCES

Grant: "A Treatise on Gear Wheels," 10th Edition, 1904, page 77, published by Philadelphia Gear Works, Philadelphia.